United States Patent
Suzuki et al.

(10) Patent No.: US 11,987,721 B2
(45) Date of Patent: May 21, 2024

(54) HEAT-SHIELDING MEMBER

(71) Applicant: NISSAN MOTOR CO., LTD., Yokohama (JP)

(72) Inventors: Yuka Suzuki, Kanagawa (JP); Yutaka Mabuchi, Kanagawa (JP); Takuma Suzuki, Kanagawa (JP); Junichi Arai, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 687 days.

(21) Appl. No.: 16/973,556

(22) PCT Filed: Jun. 13, 2018

(86) PCT No.: PCT/IB2018/000976
§ 371 (c)(1),
(2) Date: Dec. 9, 2020

(87) PCT Pub. No.: WO2019/239178
PCT Pub. Date: Dec. 19, 2019

(65) Prior Publication Data
US 2021/0253898 A1   Aug. 19, 2021

(51) Int. Cl.
*C09D 179/08* (2006.01)
*C08K 3/04* (2006.01)

(52) U.S. Cl.
CPC .............. *C09D 179/08* (2013.01); *C08K 3/04* (2013.01); *F28F 2265/10* (2013.01)

(58) Field of Classification Search
CPC .... C08K 2201/005; C08K 3/04; C08K 3/042; C09D 179/08; F02B 77/11; F16L 59/08; F28F 2265/10
See application file for complete search history.

(56) References Cited

U.S. PATENT DOCUMENTS

| | | | |
|---|---|---|---|
| 4,398,527 | A | 8/1983 | Rynbrandt |
| 2015/0204269 | A1 | 7/2015 | Hiratsuka et al. |
| 2020/0032026 | A1* | 1/2020 | Nakamura .............. B32B 15/20 |

FOREIGN PATENT DOCUMENTS

| | | |
|---|---|---|
| CA | 1200166 | 2/1986 |
| CN | 106046483 A | 10/2016 |
| CN | 106703231 A | 5/2017 |
| CN | 107778483 A | 3/2018 |
| GB | 2 086 470 A | 5/1982 |
| JP | 57-73843 A | 5/1982 |
| JP | 2013-213446 | 10/2013 |
| WO | WO 2014/024494 A1 | 2/2014 |
| WO | WO-2020152914 A1 * | 7/2020 ............... B05D 7/14 |

OTHER PUBLICATIONS

Translation of WO 2020152914 A1, Matsutomi et al., Jul. 30, 2020. (Year: 2020).*

* cited by examiner

*Primary Examiner* — Hai Vo
(74) *Attorney, Agent, or Firm* — Foley & Lardner LLP

(57) ABSTRACT

A heat shielding member includes a base, and a heat shielding membrane on the base.

The heat shielding membrane includes a porous layer including at least a closed pore. The porous layer includes resin and carbon-based filler. The heat shielding member has both of low thermal conductivity and low heat capacity and improves the fuel economy performance.

21 Claims, 1 Drawing Sheet

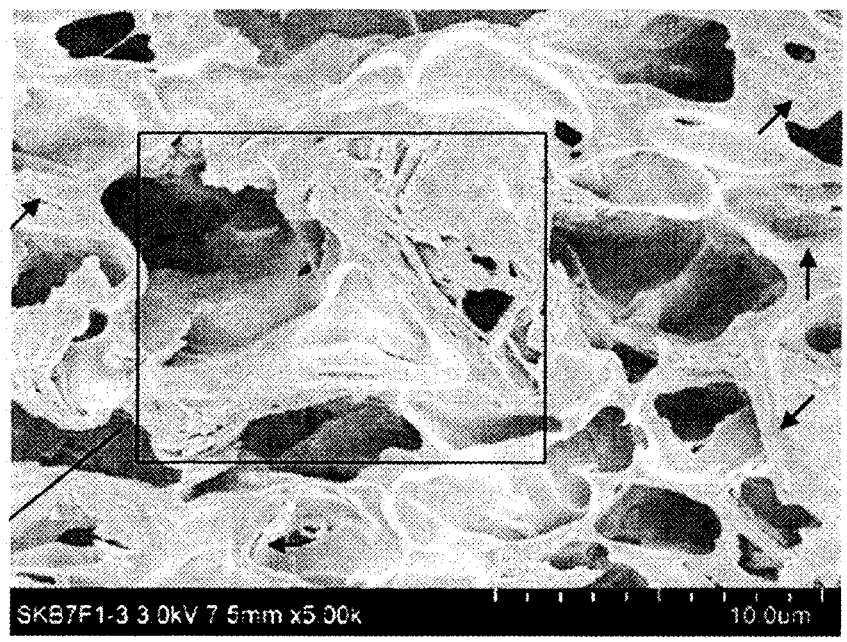

HEAT-SHIELDING MEMBER

TECHNICAL FIELD

The present invention relates to a member that includes a heat shielding membrane, and more particularly, to a member that includes a heat shielding membrane on a surface to be exposed to combustion gas, such as a combustion chamber of an internal-combustion engine.

BACKGROUND ART

Various attempts have been made to reduce energy loss for the purpose of improving efficiency of internal-combustion engines. In particular, if cooling heat loss, which accounts for a large proportion of total loss as well as exhaust loss, can be reduced, a great reduction effect is expected.

The cooling loss is a loss to be caused by cooling gas during combustion in an expansion stroke, specifically, by allowing combustion heat to be dissipated through a wall surface of the combustion chamber. Thus, the cooling loss can be reduced by increasing heat insulation performance of the wall surface of the combustion chamber.

However, even when the heat insulation performance of the wall surface of the combustion chamber is merely increased, the wall surface of the combustion chamber is gradually heated to cause heat accumulation. As a result, the heat of the combustion chamber is dissipated to the outside. In addition, intake gas is expanded by being heated by the wall surface of the combustion chamber wall, and hence intake efficiency decreases. For this reason, it is difficult to improve the fuel economy performance.

Thus, it is ideal that the wall surface of the combustion chamber have high heat-insulation performance, and in addition, a temperature of the wall surface follow change of temperature of the gas in the combustion chamber to reduce a temperature difference between the wall surface of the combustion chamber and the gas in the combustion chamber. In view of such circumstances, a heat shielding membrane having low thermal conductivity and low heat capacity has been desired.

Japanese Patent Application Laid-open No. 2013-213446 as Patent Literature 1 discloses that a heat shielding membrane made of a porous metal oxide promotes reduction in thermal conductivity and heat capacity.

CITATION LIST

Patent Document

Patent Document 1: Japanese Patent Application Laid-open No. 2013-213446

SUMMARY OF INVENTION

Technical Problem

Since the heat shielding membrane disclosed in Patent Literature 1 is porous, a heat capacity can be reduced by an amount corresponding to a volume of pores of the heat shielding membrane.

However, the pores are communication pores opening to the combustion chamber.

Thus, combustion gas enters the pores, and the pores serve as paths for releasing combustion heat to the outside. As a result, sufficient heat-insulation performance is not exhibited.

The present invention has been made in view of such problems with the conventional art, and an object thereof is to provide a heat shielding member including a heat shielding membrane that has both of low thermal conductivity and low heat capacity and improves the fuel economy performance.

Solution to Problem

The inventors of the present invention have completed the present invention by finding, through intensive studies to achieve the above-mentioned object, that a heat shielding membrane is allowed to prevent from accumulating heat and to exhibit heat insulation performance by forming a membrane having low thermal conductivity with a material having high thermal conductivity, thereby reducing cooling loss.

Specifically, according to the present invention, there is provided a member including: a base; and a heat shielding membrane on the base. In addition, the heat shielding membrane includes a porous layer including at least a closed pore and a dense layer from a side of the base, the porous layer and the dense layer include resin and carbon-based filler, an thermal decomposition temperature of the resin is 350° C. or more.

Advantageous Effects of Invention

According to the present invention, heat shielding is effected with use of the resin membrane including the closed pore and the carbon-based filler. With this, a member capable of having both of low thermal conductivity and low heat capacity and improving the fuel economy performance can be provided.

BRIEF DESCRIPTION OF DRAWINGS

FIG. 1 is a cross-sectional image of a porous layer of a heat shielding member of Example 3.

DESCRIPTION OF THE EMBODIMENTS

The heat shielding member according to the present invention is described in detail.

The member includes a base, and a heat shielding membrane on the base.

The heat shielding membrane includes at least a porous layer, and when necessary, further includes a stack of a dense layer and a heat-resistant layer.

Porous Layer

The porous layer is a layer formed by dispersing carbon-based filler in resin so as to form closed pores therein.

When the carbon-based filler is dispersed in the resin, thermal conductivity of the resin part that forms a skeleton of the porous layer is improved, and a temperature of the heat shielding membrane follows a temperature of gas in a combustion chamber. As a result, heat accumulation is prevented.

All of the carbon-based filler need not necessarily be dispersed in the resin, and some of the carbon-based filler may be present in the closed pores. However, the carbon-based filler present in the closed pores do not contribute to the improvement of the thermal conductivity of the resin part. Thus, all of the carbon-based filler is preferably dispersed in the resin.

As examples of the carbon-based filler, there may be mentioned graphene, graphite, carbon fiber, carbon nanotube, carbon nanohorn, and fullerene, and these materials may be used alone or in combination of two or more.

Among them, graphene and graphite can be preferably used due to their excellent dispersibility in the resin as described below, capability of increasing a content of the carbon-based filler, capability of increasing the thermal conductivity of the resin part that forms the skeleton of the porous layer, and capability of preventing the heat accumulation of the heat shielding membrane.

In addition, graphene has a layered structure in which graphite monolayers are stacked, and has high thermal conductivity and excellent mechanical strength.

An average secondary particle diameter of the carbon-based filler is preferably 10 μm or less, more preferably 5 μm or less, and still more preferably 3 μm or less. When the average secondary particle diameter of the carbon-based filler is increased, the dispersibility in the resin may decrease. As a result, the thermal conductivity of the resin part may also decrease.

A lower limit of the average secondary particle diameter of the carbon-based filler is not particularly limited, and a substantial lower limit is approximately 0.5 μm. When the average secondary particle diameter of the carbon-based filler is small, the carbon-based filler can be uniformly dispersed. However, when a dispersion medium or the like is used to prevent aggregation of the carbon-based filler, concentration of the carbon-based filler in a coating liquid may decrease. As a result, the content of the carbon-based filler may decrease in the porous layer. In addition, when the carbon-based filler is too small, heat transfer paths to be formed of the carbon-based filler may be discontinued. As a result, the thermal conductivity of the porous layer may decrease.

A Raman spectroscopy spectrum of the porous layer, when an Ar laser beam of 514.5 nm is used, preferably has a G-band derived from a graphite structure at a peak wavenumber from 1577 $cm^{-1}$ to 1581 $cm^{-1}$, and a band width of the G-band is preferably 25 $cm^{-1}$ or less.

The G-band, which is a peak derived from in-plane motion of $sp^2$-bonded carbon atoms, shifts to a low frequency side as the number of the graphite layers increases. In addition, as the band width (half width), which represents a degree of orientation of graphite contained in the carbon-based filler, becomes narrower, the orientation becomes higher and the thermal conductivity becomes more excellent.

The content of the carbon-based filler in the porous layer, which is measured from a cross-sectional image of the porous layer, is preferably 1% or more and 22% or less, more preferably 3% or more and 22% or less, still more preferably 8% or more and 22% or less, and yet more preferably 13% or more and 22% or less.

By setting the content of the carbon-based filler in the porous layer within these ranges, the temperature of the heat shielding membrane is allowed to follow the temperature of the gas in the combustion chamber.

In addition, the porous layer includes the closed pores. The closed pores herein refer to pores that are sealed in the porous layer, and do not communicate with a surface of the heat shielding membrane. These closed pores may be independent pores that are independent of each other, or may be continuous with each other in the porous layer to form communication holes.

When the pores of the porous layer are the closed pores, and combustion gas does not enter these pores, heat exchange between the heat shielding membrane and the combustion gas is reduced to improve heat insulation performance. In addition, heat capacity of the heat shielding membrane can be reduced by an amount corresponding to a volume to be occupied by the closed pores.

The heat capacity herein means a volume-based heat capacity ($J/m^3 \cdot K$).

A porosity of the porous layer is preferably 25% or more and 80% or less, preferably 30% or more and 50% or less, and still more preferably 30% or more and 40% or less.

When the porosity falls within these ranges, the heat shielding membrane is allowed to have both of heat insulation performance and strength.

An average diameter of the closed pores is preferably 1 μm or more and 200 μm or less, more preferably 3 μm or more and 100 μm or less, and still more preferably 5 μm or more and 50 μm or less. When the average diameter of the closed pores falls within these ranges, the closed pores are uniformly dispersed in the porous layer, and together with the aforementioned porosity, a large heat transfer path is not formed and uniform heat insulation performance is obtained.

The average diameter of the closed pores can be calculated by taking a cross-sectional image of the porous layer, using a diameter of a circle having the same area as a pore as a pore diameter (equivalent circle diameter), and averaging the diameters of the pores in a field of view.

A thermal decomposition temperature of the above-described resin is preferably 200° C. or higher, and more preferably 350° C. or higher. When the thermal decomposition temperature is 350° C. or higher, the heat shielding membrane can be prevented from decreasing in membrane thickness due to thermal decomposition even when being exposed to combustion gas, and hence can be improved in durability.

As examples of the resin, there may be mentioned a polyimide resin, a polyamide resin, and a polyamideimide resin. Among them, the polyimide resin can be preferably used because its thermal decomposition temperature is 400° C. or higher.

A membrane thickness of the porous layer is preferably 10 μm or more and 200 μm or less, preferably 30 μm or more and 100 μm or less, and still more preferably 40 μm or more and 70 μm or less.

When the membrane thickness of the porous layer is less than 10 μm, a sufficient beat-insulating effect may not be exerted. When the membrane thickness exceeds 200 μm, the heat capacity may so increase as to hinder the temperature of the heat shielding membrane from following the temperature of the gas in the combustion chamber. As a result, the cooling loss may increase.

The thermal conductivity of the porous layer is preferably 0.25 W/(m·K) or less, and preferably 0 2 W/(m·K) or less. In addition, heat capacity of the porous layer is preferably 600 $J/m^3 \cdot K$ or less, and more preferably 500 $J/m^3 \cdot K$ or less. When the porous layer has both of the thermal conductivity and the heat capacity in these ranges, the cooling loss is reduced and the fuel economy performance is improved.

Dense Layer

The heat shielding membrane may include the dense layer on the surface side of the porous layer.

The dense layer is a solid layer including resin, carbon-based filler, and no internal voids.

When the porous layer is covered with this dense layer, the pores of the porous layer can be reliably sealed not to open in the surface of the heat shielding membrane. With this, the heat insulation performance can be improved.

A membrane thickness of the dense layer is preferably 1 μm or more and 30 μm or less, and preferably 1 μm or more and 20 μm or less. When the membrane thickness is less than 1 μm, not all the pores may be sealed. When the membrane thickness exceeds 30 μm, the heat capacity may so increase as to hinder the temperature of the heat shielding membrane from following the temperature of the gas in the combustion chamber.

Alternatively, also by changing a ratio of the dense layer and the porous layer, or changing the porosity of the porous layer, the heat resistance and the strength can be improved.

The resin and the carbon-based filler to be used to form the dense layer may be the same materials as those for the above-described porous layer.

Heat-Resistant Layer

The heat shielding membrane may include the heat-resistant layer on its outermost surface.

When the heat-resistant layer with a thermal decomposition temperature of 500° C. or higher is present on the outermost surface, the heat shielding membrane can be prevented from decreasing in membrane thickness due to thermal decomposition, and hence can be improved in durability.

A membrane thickness of the heat-resistant layer is preferably 1 μm or more and 5 μm or less. When the membrane thickness falls within this range, an effect to be obtained by providing the heat-resistant layer can be sufficiently exerted, and the heat shielding membrane can be prevented from increasing in heat capacity.

As examples of the heat-resistant layer, there may be mentioned an inorganic membrane containing silica as a main component and an amorphous-carbon-based membrane formed, for example, of diamond-like carbon.

Base

As the base, the materials conventionally used for internal combustion engines, such as aluminum, magnesium, iron, and alloys thereof, may be used.

Heat Shielding Member

The heat shielding member of the present invention includes the heat shielding membrane having the high heat-insulation performance and the low heat capacity.

Thus, when the heat shielding member is used at parts to be exposed to the combustion gas in an internal combustion engine, the cooling loss can be reduced and the fuel economy performance can be improved.

As examples of members of the internal combustion engine, which are exposed to the combustion gas, there may be mentioned not only cylinder heads, cylinders, pistons, and valves that constitute the combustion chamber, but also exhaust-system members such as cylinder-head exhaust ports, an exhaust manifold, exhaust pipes, and a supercharger.

Manufacturing Method

The above-described heat shielding membrane can be prepared by stacking the porous layer, and if necessary, the dense layer and the heat-resistant layer sequentially on the base.

The porous layer and the dense layer can be formed, for example, by applying a coating liquid containing a polyamic acid, which is a precursor of a polyimide resin, and the carbon-based filler onto the base, and then drying and imidizing the coating liquid.

A solvent for the coating liquid is not limited as long as polyimide is not dissolved to form gel or precipitate. As examples of the solvent, there may be mentioned pyrrolidone-based solvents such as N-methyl-2-pyrrolidone, and amide-based solvents including formamide-based solvents such as N,N-dimethylformamide, and acetamide-based solvents such as N,N-dimethylacetamide.

As examples of a method of forming the pores in the porous layer, there may be mentioned a method including using a porous-layer coating liquid that has been phase-separated with use of a plurality of solvents having different solubilities in the polyamic acid, and a method including mixing hollow beads into the porous-layer coating liquid.

The phase-separated porous-layer coating liquid can be prepared by mixing the amide-based solvents and ether-based solvents with each other. Specifically, the amide-based solvents tend to have high solubility in imide-based polymer, and the ether-based solvents tend to have lower solubility in the imide-based polymer than that of the amide-based solvents. Thus, the phase separation is easily caused, and the pores are formed by volatilization of the phase-separated ether-based solvents.

The porosity of the porous layer can be adjusted by a mixing ratio of the amide-based solvent and the ether-based solvent. A content rate of the ether-based solvent in the porous-layer coating liquid is preferably 30% by mass or more and 90% by mass or less of a total amount of the amide-based solvent and the ether-based solvent.

As examples of the ether-based solvent, there may be mentioned diethylene glycol dimethyl ether, triethylene glycol dimethyl ether, tetraethylene glycol dimethyl ether, diethylene glycol, and triethylene glycol.

The coating liquid may further contain additives such as a surfactant and an anti-settling agent. When the surfactant is contained, the carbon-based filler contained in the coating liquid can be uniformly dispersed, and the dispersed state can be maintained.

The heat-resistant layer can be prepared, for example, by applying a solution containing polysilazane onto the dense layer and curing the applied solution to form the inorganic membrane containing silica as the main component, or by forming an amorphous carbon based membrane by chemical vapor deposition method or physical vapor deposition method.

EXAMPLES

Now, Examples of the present invention are described in detail. It should be understood that the present invention is not limited to Examples below.

Example 1

Preparation of Porous Layer

The porous-layer coating liquid was prepared by adding a polyamic acid at a solid content concentration of 26% by mass and 0.05% by mass of carbon-based filler (average flake thickness of 8 nm (20 to 30 molecular layers) graphene nanopowder; G-11L; manufactured by EM Japan Co., LTD.) to a solvent containing dimethylacetamide (DMAc) and tetraethylene glycol dimethyl ether (TEGM) at a mass ratio of 1:1.

The porous-layer coating liquid was applied by a spin coater onto an aluminum base washed by immersion in water at 100° C. for 10 minutes, and then imidized by drying at 130° C. for 30 minutes, followed by heating at 200° C. for 60 minutes. In this way, a porous layer with a membrane thickness of 40 μm was formed.

Preparation of Dense Layer

A dense-layer coating liquid was prepared in the same way as that for the porous-layer coating liquid except using dimethylacetamide (DMAc) as the solvent. Then, the dense-layer coating liquid was applied onto the porous layer, and then imidized by drying at 130° C. for 30 minutes, followed by heating at 200° C. for 60 minutes, whereby a dense layer with a membrane thickness of 5 μm was formed. In this way, the heat shielding member was obtained.

Example 2

The heat shielding member was obtained as in Example 1 except changing the content of the carbon-based filler to 0.4% by mass and forming a porous layer with a membrane thickness of 70 μm.

Example 3

The heat shielding member was obtained as in Example 2 except changing the content of the carbon-based filler to 0.6% by mass.

Example 4

The heat shielding member was obtained as in Example 2 except changing the content of the carbon-based filler to 0.8% by mass.

Example 5

The heat shielding member was obtained by forming a heat-resistant layer with a thickness of 3 μm through application of a polysilazane solution onto the dense layer prepared in Example 3 and curing of the applied polysilazane solution.

Example 6

Porous Layer
A porous layer with a membrane thickness of 100 μm was formed as in Example 1 except using a porous-layer coating liquid prepared by adding a polyamic acid at the solid content concentration of 26% by mass and 0.2% by mass of carbon-based filler (carbon black) to the solvent containing dimethylacetamide (DMAc) and tetraethylene glycol dimethyl ether (TEGM) at the mass ratio of 1:1.
Dense Layer
A dense-layer coating liquid containing carbon black as the carbon-based filler was prepared in the same way as that for the porous-layer coating liquid except using dimethylacetamide (DMAc) as the solvent.
This dense-layer coating liquid was applied onto the porous layer, and then imidized by drying at 130° C. for 30 minutes, followed by heating at 200° C. for 60 minutes, whereby the dense layer with the membrane thickness of 5 μm was formed. In this way, the heat shielding member was obtained.

Comparative Example 1

Porous Layer
A porous layer with a membrane thickness of 100 μm was formed as in Example 1 except using a porous-layer coating liquid prepared by adding a polyamic acid at the solid content concentration of 26% by mass to the solvent containing dimethylacetamide (DMAc) and tetraethylene glycol dimethyl ether (TEGM) at the mass ratio of 1:1.
Preparation of Dense Layer
A dense-layer coating liquid was prepared by adding a polyamic acid at the solid content concentration of 26% by mass to the solvent containing dimethylacetamide (DMAc) and tetraethylene glycol dimethyl ether (TEGM) at the mass ratio of 1:1.
This dense-layer coating liquid was applied onto the porous layer, and then imidized by drying at 130° C. for 30 minutes, followed by heating at 200° C. for 60 minutes, whereby the dense layer with the membrane thickness of 5 μm was formed.
Preparation of Heat-Resistant Layer
The heat-resistant layer with the thickness of 3 μm was formed by applying the polysilazane solution onto the dense layer and curing the applied polysilazane solution. In this way, the heat shielding member was obtained.

Comparative Example 2

The heat shielding member was obtained by forming a dense layer with a membrane thickness of 70 μm through application of the dense-layer coating liquid prepared in Example 3 onto the aluminum base.

Comparative Example 3

The heat shielding member was obtained by forming a heat shielding membrane with a thickness of 200 μm through thermal spraying of zirconia particles onto the aluminum base.
Evaluation
Cross-sections of the heat shielding members were captured with a scanning electron microscope, and the porosities of the porous layers, the contents of the carbon-based filler, and the average secondary particle diameters of the carbon-based filler were measured by image analysis.
FIG. 1 is a cross-sectional image of a porous layer of the heat shielding member of Example 3.
In FIG. 1, positions where the carbon-based filler is present were indicated by arrows.
Porosity
A binarized image was generated by converting the cross-sectional image to a gray scale image with use of a small general-purpose image analyzer (manufactured by Nireco Corporation; LUZEX AP), and by setting a threshold value between the pores and the resin part. From this binarized image, a total area of the pores in an entirety of the cross-sectional image of the porous layer was calculated as an area percentage of the pores. This area percentage was determined as the porosity.
Content of Carbon-Based Filler
The content of the carbon-based filler was calculated from a binarized image generated by setting a threshold between the resin and the carbon-based filler and by the following equation (1).

$$\text{Area of Carbon-Based Filler}/(\text{Area of Resin}+\text{Area of Carbon-Based Filler})\times 100 \qquad \text{Equation (1)}$$

Average Secondary Particle Diameter
The average secondary particle diameter of the carbon-based filler was calculated by using a diameter of a perfect circle having the same area as a projected area of the carbon-based filler as a particle diameter of the carbon-based filler (equivalent circle diameter), and by averaging the particle diameters of the carbon-based filler in the field of view.
Raman Spectrum
The Raman spectrum of the porous layer was determined with use of a laser Raman spectrometer (Ramanor T-64000, manufactured by Jobin Yvon SA), specifically, by the laser Raman spectroscopy with use of the Ar laser beam at 514.5 nm. In this way, the G-band peak wavenumber and the half width of the G-band were measured.

Thermal Decomposition Temperature

The thermal decomposition temperature of the resin of the porous layer and the dense layer, and the thermal decomposition temperature of the heat-resistant layer were measured by thermogravimetry (TG).

Specifically, temperatures were raised at 10° C./min while causing air to flow into sample chambers at 100 mL/min, and temperatures at which a mass loss rate reached 5% was determined as the thermal decomposition temperatures.

Thermal Conductivity

A thermal conductivity $\lambda$ W/(m·K) of the porous layer was calculated by the following equation (2).

$$\lambda = \rho C_p \alpha \qquad \text{Equation (2)}$$

In the equation (2), $\rho$ is a density of the porous layer, $C_p$ is a specific heat capacity of the porous layer, and $\alpha$ is a thermal diffusivity of the porous layer.

The density $\rho$ of the porous layer was calculated by forming a porous layer with a thickness of approximately 1 mm on a base, cutting out a test sample with a size of 13 mm×5 mm, measuring a weight of this test sample, calculating a density of the base and the porous layer, and then subtracting therefrom a density of the base.

For measurement of the specific heat capacity $C_p$ of the porous layer, the base was completely dissolved by applying a Teflon (trademark) tape to the porous layer and immersing in hydrochloric acid.

Then, remaining porous layer was immersed into acetone, and the Teflon (trademark) tape was peeled off. In this way, a powdery porous sample was obtained.

For 12 mg of this sample, the specific heat capacity $C_p$ of the porous layer was measured by using a differential scanning calorimeter (manufactured by PerkinElmer Inc.; DSC-7 type) in an argon-gas atmosphere at a measurement temperature of 20° C.

For calculation of the thermal diffusivity $\alpha$ of the porous layer, a surface on the base side, on which the porous layer had been formed, was polished to 1 mm. Then, a disc with a diameter of 10 mm was cutout therefrom. In this way, a test piece was obtained.

An area thermal-diffusion time of this test piece was calculated from a standardized temperature-time curve by a laser flash method with use of a thermal-constant measuring apparatus (TC-7000 manufactured by ULVAC-RIKO, Inc.) at room temperature (20° C.) in the air.

Then, a thermal-diffusion time of the porous layer was calculated from the area thermal-diffusion time, and the thermal diffusivity $\alpha$ was calculated from the thermal-diffusion time of the porous layer and the membrane thickness of the porous layer.

Heat Capacity

A volumetric heat capacity Cv (J/(m³·K)) of the porous layer was calculated by the following equation (3).

$$Cv = C_P \rho \qquad \text{Equation (3)}$$

In the equation (3), $C_P$ is the specific heat capacity (J/(kg·K)) of the porous layer, and $\rho$ is the density (kg/m³) of the porous layer.

Fuel Economy

Fuel economy characteristics were evaluated on the basis of a bench fuel-economy test with use of a gasoline engine. Driving conditions were set according to 10.15 mode administered by the Ministry of Land, Infrastructure, Transport and Tourism of Japan.

Fuel-economy improvement rates were measured on an assumption that fuel economy in Comparative Example 3 was 0%.

Table 1 shows results of the evaluation.

TABLE 1

| | Resin | | Carbon-Based Filler | | | |
|---|---|---|---|---|---|---|
| | Type | Thermal Decomposition Temperature (° C.) | Type | Average Secondary Particle Diameter (μm) | G-band Peak Wavenumber | Band width of G-band |
| Example 1 | Polyimide | 450 | Graphene | 2.3 | 1578 | 18.9 |
| Example 2 | Polyimide | 450 | Graphene | 2.3 | 1578 | 18.9 |
| Example 3 | Polyimide | 450 | Graphene | 2.3 | 1578 | 18.9 |
| Example 4 | Polyimide | 450 | Graphene | 2.3 | 1578 | 18.9 |
| Example 5 | Polyimide | 450 | Graphene | 2.3 | 1578 | 18.9 |
| Example 6 | Polyimide | 450 | Carbon Black | 1.0 | 1598 | 66.2 |
| Comparative Example 1 | Polyimide | 450 | — | — | — | — |
| Comparative Example 2 | Polyimide | 450 | Graphene | 2.3 | 1578 | 18.9 |
| Comparative Example 2 | (ZrO2) | — | — | — | — | — |

| | Porous Layer | | | | |
|---|---|---|---|---|---|
| | Porosity (%) | Content of Carbon-Based Filler (%) | Membrane Thickness (μm) | Thermal Conductivity W/(m · K) | Heat Capacity (J/m3 · K) |
| Example 1 | 40 | 1.42 | 40 | 0.072 | 581 |
| Example 2 | 40 | 11.33 | 70 | 0.12 | 409 |
| Example 3 | 40 | 17.03 | 70 | 0.19 | 465 |
| Example 4 | 40 | 23 | 70 | 0.23 | 481 |

TABLE 1-continued

| | | | | | |
|---|---|---|---|---|---|
| Example 5 | 40 | 17.03 | 70 | 0.19 | 465 |
| Example 6 | 30 | 5.68 | 100 | 0.16 | 1174 |
| Comparative Example 1 | 40 | — | 100 | 0.069 | 650 |
| Comparative Example 2 | — | 17.03 | 70 | 2.22 | 1506 |
| Comparative Example 3 | 40 | — | 200 | 1.36 | 2572 |

| | | Rating | | |
|---|---|---|---|---|
| | Heat-Resistant Layer Type | Thermal Decomposition Temperature (° C.) | Membrane Thickness (μm) | Fuel Economy (%) |
| Example 1 | N/A | — | — | 2 |
| Example 2 | N/A | — | — | 3 |
| Example 3 | N/A | — | — | 3 |
| Example 4 | N/A | — | — | 1 |
| Example 5 | Polysilazane | 1650 | 3 | 3 |
| Example 6 | N/A | — | — | 2 |
| Comparative Example 1 | Polysilazane | 1650 | 3 | 0 |
| Comparative Example 2 | N/A | — | — | 0 |
| Comparative Example 3 | N/A | — | — | 0 |

The heat shielding members of Examples, which include the carbon-based filler and the closed pores have higher temperature-following performance and higher fuel-economy performance compared with the heat shielding member of Comparative Example 1, which does not include the carbon-based filler. In addition, they have higher heat-insulation performance and higher fuel-economy performance compared with the heat shielding member of Comparative Example 2, which does not include the closed pores.

These results demonstrate that the heat shielding member according to the present invention is capable of having both of low thermal conductivity and low heat capacity, and improving the fuel economy performance.

In addition, carbon black has disordered graphite orientation, and hence is lower in thermal conductivity compared with graphene. Thus, temperature following performance decreases. As a result, fuel economy performance was decreased compared with Examples in which graphene was used.

The invention claimed is:

1. A heat shielding member, comprising:
a base made of a material selected from the group consisting of aluminum, magnesium, iron, and alloys thereof; and
a heat shielding membrane on the base, wherein the heat shielding membrane comprises, in a direction away from the base:
a porous layer including a plurality of pores that are sealed so as not to communicate with a surface of the heat shielding membrane,
a dense layer, and
a heat-resistant layer located at an outermost surface of the heat shielding membrane opposite the base, the heat-resistant layer comprising an inorganic membrane containing silica as a main component,
wherein:
the porous layer and the dense layer each comprise a resin and a carbon-based filler,
the resin comprises a polyimide resin, and
a thermal decomposition temperature of the resin is 350° C. or more.

2. The heat shielding member according to claim 1, wherein the plurality of pores include at least some pores that communicate with each other via a communication hole.

3. The heat shielding member according to claim 2, wherein a Raman spectroscopy spectrum of the porous layer, when an Ar laser beam at 514.5 nm is used, has a G-band derived from a graphite structure at a peak wavenumber from 1577 $cm^{-1}$ to 1581 $cm^{-1}$, and a band width of the G-band is 25 $cm^{-1}$ or less.

4. The heat shielding member according to claim 2, wherein a porosity of the porous layer is 25% or more and 80% or less.

5. The heat shielding member according to claim 2, wherein a thermal decomposition temperature of the heat-resistant layer is 500° C. or more.

6. The heat shielding member according to claim 1, wherein an average particle diameter of the carbon-based filler is 10 μm or less.

7. The heat shielding member according to claim 6, wherein a Raman spectroscopy spectrum of the porous layer, when an Ar laser beam at 514.5 nm is used, has a G-band derived from a graphite structure at a peak wavenumber from 1577 cm−1 to 1581 $cm^{-1}$, and a band width of the G-band is 25 cm−1 or less.

8. The heat shielding member according to claim 1, wherein a Raman spectroscopy spectrum of the porous layer, when an Ar laser beam at 514.5 nm is used, has a G-band derived from a graphite structure at a peak wavenumber from 1577 $cm^{-1}$ to 1581 $cm^{-1}$, and a band width of the G-band is 25 $cm^{-1}$ or less.

9. The heat shielding member according to claim 8, wherein a content of the carbon-based filler in the porous layer, measured from a cross-sectional image of the porous layer, is 1% or more and 22% or less.

10. The heat shielding member according to claim 8, wherein the content of the carbon-based filler in the porous layer, measured from a cross-sectional image of the porous layer, is 8% or more and 22% or less.

11. The heat shielding member according to claim 8, wherein the content of the carbon-based filler in the porous layer, measured from a cross-sectional image of the porous layer, is 13% or more and 22% or less.

12. The heat shielding member according to claim 8, wherein the carbon-based filler is present in the pores in the porous layer.

13. The heat shielding member according to claim 1, wherein a porosity of the porous layer is 25% or more and 80% or less.

14. The heat shielding member according to claim 1, wherein a thermal decomposition temperature of the heat-resistant layer is 500° C. or more.

15. An internal combustion engine comprising the heat shielding member according to claim 1.

16. The heat shielding member according to claim 1, wherein a porosity of the porous layer is 80% or less.

17. A heat shielding member, comprising:
a base made of a material selected from the group consisting of aluminum, magnesium, iron, and alloys thereof; and
a heat shielding membrane on the base, wherein the heat shielding membrane comprises, in a direction away from the base:
a porous layer including a plurality of pores that are sealed so as not to communicate with a surface of the heat shielding membrane,
a dense layer, and
a heat-resistant layer located at an outermost surface of the heat shielding membrane opposite the base, the heat-resistant layer comprising an amorphous-carbon-based membrane, wherein:
the porous layer and the dense layer each comprise a resin and a carbon-based filler,
the resin comprises a polyimide resin, and
a thermal decomposition temperature of the resin is 350° C. or more.

18. The heat shielding member according to claim 17, wherein the plurality of pores include at least some pores that communicate with each other via a communication hole.

19. The heat shielding member according to claim 17, wherein an average particle diameter of the carbon-based filler is 10 μm or less.

20. The heat shielding member according to claim 17, wherein a Raman spectroscopy spectrum of the porous layer, when an Ar laser beam at 514.5 nm is used, has a G-band derived from a graphite structure at a peak wavenumber from 1577 $cm^{-1}$ to 1581 $cm^{-1}$, and a band width of the G-band is 25 $cm^{-1}$ or less.

21. The heat shielding member according to claim 17, wherein a porosity of the porous layer is 80% or less.

* * * * *